United States Patent [19]

Smith

[11] Patent Number: 5,224,740
[45] Date of Patent: Jul. 6, 1993

[54] HANDLE AND QUICK-ACTION COUPLING

[75] Inventor: David L. Smith, Ipswich, Mass.

[73] Assignee: Siemens Medical Electronics, Inc., Danvers, Mass.

[21] Appl. No.: 843,137

[22] Filed: Feb. 28, 1992

[51] Int. Cl.$^5$ .............................................. F16L 35/00
[52] U.S. Cl. ...................................... 285/38; 285/316
[58] Field of Search ................ 16/110.5; 285/277, 316, 285/38

[56] References Cited

U.S. PATENT DOCUMENTS

| | | | |
|---|---|---|---|
| 2,735,993 | 2/1956 | Humphrey | 285/316 |
| 3,468,562 | 9/1969 | Ho Chow et al. | 285/277 |
| 3,594,694 | 7/1971 | Clark | 339/45 M |
| 3,635,501 | 1/1972 | Thorne-Thomsen | 285/34 |
| 4,591,192 | 5/1986 | Van Exel et al. | 285/83 |
| 4,844,513 | 7/1989 | St. Louis et al. | 285/39 |
| 4,872,710 | 10/1989 | Konecny et al. | 285/81 |
| 5,046,763 | 9/1991 | Martucci et al. | 285/81 |

Primary Examiner—John Sipos
Assistant Examiner—Carmine Cuda
Attorney, Agent, or Firm—Lawrence C. Edelman

[57] ABSTRACT

A handle, for the female half of a quick-action coupling of the type including a body having a first end adapted to receive a hose and a second end adapted to receive the male half of the coupling, a grasping means coupled to the body for releasably grasping the male half of the coupling when inserted into the second end of the body, and a spring-biased slide member coupled to the body and co-acting with the grasping means for causing a locking engagement between the male and female halves. The handle comprises a housing having an interior opening in a first end thereof dimensioned so as to receive the female half of the coupling therein in a loose-fit sliding manner. The housing has a first interior annular portion remote from the first end for engaging the body of the female half of the coupling so as to push the female half of the coupling towards a corresponding male half of the coupling, without impeding movement of the slide member relative to the body, and a second interior annular portion for engaging the slide member so as to slide the slide member within the interior opening relative to the body when the user pulls the housing away from the male half of the coupling.

5 Claims, 2 Drawing Sheets

HANDLE AND QUICK-ACTION COUPLING

BACKGROUND OF THE INVENTION

1. Field of the Invention

The present invention relates to quick-action couplings, and in particular, to a handle which provides a convenient grasp position for a user so as to allow simplified engagement/disengagement of the coupling.

2. Description of the Prior Art

FIG. 1 illustrates a typical prior art push-type quick-action coupling commonly used for e.g., air hoses, or the like. The coupling includes a female half 10 and a male half 12. Each half of the coupler includes a hose-receiving barb portion 14, 16, which is adapted to be a slidable fit into respective hoses which are to be joined together by the quick-action coupler. Couplers of this type can be purchased from, for example, OBAC Corporation, Route 15, PO Box 873, Sparta, NJ 07871 as the Series 20 coupler. The coupler illustrated in FIG. 1 is available from OBAC as Part Number 20KATF04MPX, but which has been slightly modified in the version shown in FIG. 1 by deleting surface knurling on a portion of the female half and also by deleting a locking hex nut.

The female half of this push-on type of quick-action coupler includes a body 18 formed integrally with its hose portion 14 and a slide 20 which, in conjunction with an internal sliding portion (shown in detail in FIG. 3), selectively captivates a plurality of ball bearings in an annular groove inside half 10 of the coupler for releasably engaging the male half when inserted therein. When the male end of the coupler is inserted into the female half at an open end 22, slide 20 must be free to move in order to allow the interior ball bearings to reposition themselves so as to grab an annular groove 26 in the male terminal being inserted. Thus, the user must not grasp slide 20 when making the coupling. No convenient place is provided for the user to grasp, and the user must grasp either the rear portion of the female half, or if the rear portion is to small, the hose attached to the rear portion of the female half. As the male half is inserted, slide 20 slides forward, pressing the interior ball bearings into groove 26 and thereby locking the two hose halves together.

For releasing the coupling, however, it is necessary for one to grasp slide 20 and slide it back relative to the body 18 in order that the interior ball bearings can travel into a recess on an inner portion of slide 20, and thereby allow the male half 12 of the hose connection to be separated from the female half 10. FIG. 1 is only one example of such a releasable type of locking coupler.

Although couplers such as these are well suited to provide a quick acting and securely locked connection for two hoses, as noted above, it is necessary that, for connection, slide 20 of the female coupler must not be grasped, in order that it is free to move and allow the male half to properly engage the locking ball bearings. However, for disengaging the connection, slide 20 must be grasped in order to slide it back relative to body 18. Thus, for operation of this type of coupler, two different positions on the female half of the connection must be grasped by the user depending upon whether one is trying to make or break the quick-action coupler. To complicate matters even further, quite often slide 20 includes knurling, to aid its grasping. This even further confuses the user because if the user would grasp the knurled portion of slide 20 when trying to make the connection, they would find that the connection cannot be made. Only experienced users of such a coupler realize that slide 20 should only be grasped when breaking the connection.

It is an object of the present invention to provide a handle for this type of prior art coupling wherein only one grasping position is required for either making or breaking the coupling.

It is a further object of the invention to provide a simple and reliable way to make and break a push-type quick-action coupling for those that are unfamiliar with couplings of this type.

These and other objects of the invention will become apparent from the following detailed description of a preferred embodiment of the invention, the accompanying drawings and the claims.

SUMMARY OF THE INVENTION

A handle for the female half of a quick-action coupling of the type including a body having a first end adapted to receive a hose and a second end adapted to receive the male half of the coupling, a grasping means coupled to the second end of the body for releasably grasping the male half of the coupling when inserted into the second end of the body, and a spring-biased slide member coupled to the body and co-acting with the grasping means for causing a locking engagement between the male and female halves, wherein the user must grasp the slide member and move it relative to the body in order to cause the grasping means to release the male half of the coupling, but the user must not grasp the slide member when coupling the female and the male halves together, the handle comprising: a housing having an interior opening in a first end thereof dimensioned so as to receive the female half of the coupling in a loose-fit sliding manner, the housing having a first annular portion in its interior opening which is remote from the first end for engaging the body of the female half of the coupling so as to enable a user to push the female half of the coupling, via the housing, towards a corresponding male half of the coupling, without impeding relative sliding movement between the slide member and the body, and the housing including a second annular portion in its interior opening which is near said first end for engaging the slide member so as to slide the slide member relative to the body when the user pulls on the housing to separate the male and female halves of the coupling.

DETAILED DESCRIPTION OF THE PREFERRED EMBODIMENT OF THE INVENTION

Figure 1:
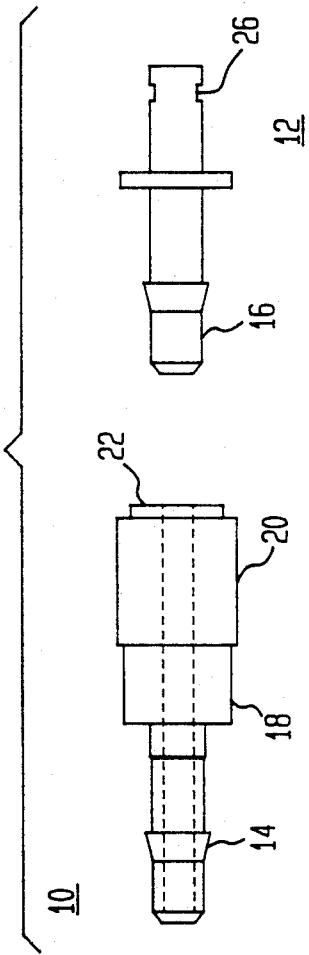
FIG. 1 illustrates the conventional push-type quick-action coupling, already described.
Figure 2:
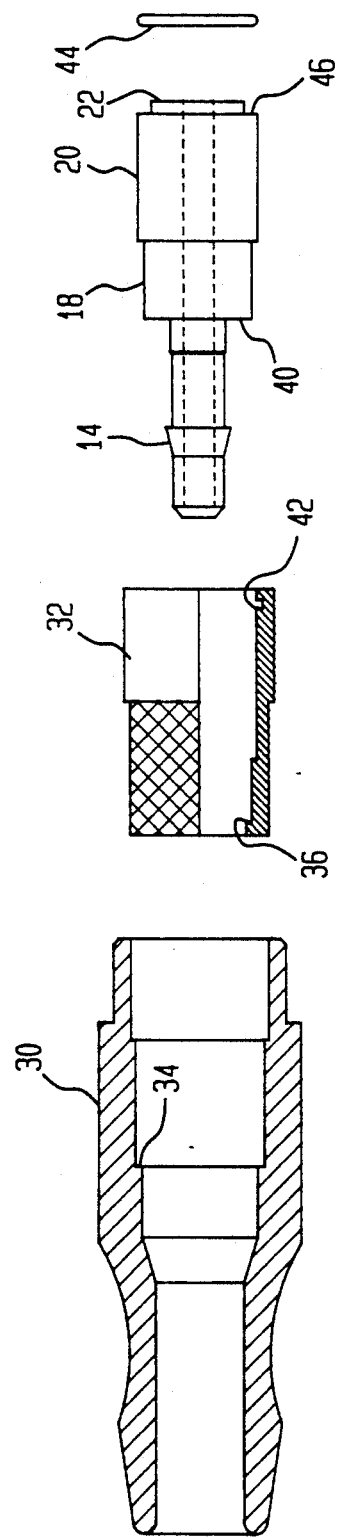
FIG. 2 illustrates in partial section view an assembly drawing for the novel handle arrangement of the present invention.

FIG. 2 illustrates an assembly drawing for the preferred embodiment of the present invention. A plastic molded housing 30 has a bore therethrough which is dimensioned so as to receive a brass sleeve 32 at one end thereof. Sleeve 32 can be dimensioned so as to require a press fit into handle 30 until it reaches an annular shoulder portion 34. Sleeve 32 may include knurling on at least a portion thereof, as shown in FIG. 2, if sleeve 32 is being pressed into handle 30. Alternatively, sleeve 32 could be molded-in-place into handle 30. Sleeve 32 is dimensioned so that its inside diameter can admit the largest diameter of the female half 10 of the coupling, i.e., slide 20, in a loose fit sliding manner. An annular shoulder portion 36 is included on the inside surface near one end of sleeve 32 and is dimensioned so as to be engageable with the rear end 40 of body 18 of the female half 10 of the coupling. In this preferred embodiment, sleeve 32 also includes a groove 42 near its other end and which is dimensioned so as to receive a snap ring 44. The placement and dimensioning of snap ring 44 is such as to allow the male half 12 of the coupling to enter therethrough, but so as to also be engagable with end 46 of slide member 20 when the handle is pulled by the user. Additionally, snap ring 44 prevents the female half 10 of the coupling from falling out of sleeve 32.

Although in the preferred embodiment a sleeve 32 is utilized, it is noted that sleeve 32 is provided in order to allow handle 30 to be made of a plastic material while still providing durable internal mating surfaces for grasping the female half of the coupling. In an alternative embodiment of the invention, sleeve 32 and housing 30 could be coupled together in some other manner, or be manufactured together as a single piece.

Figure 3:
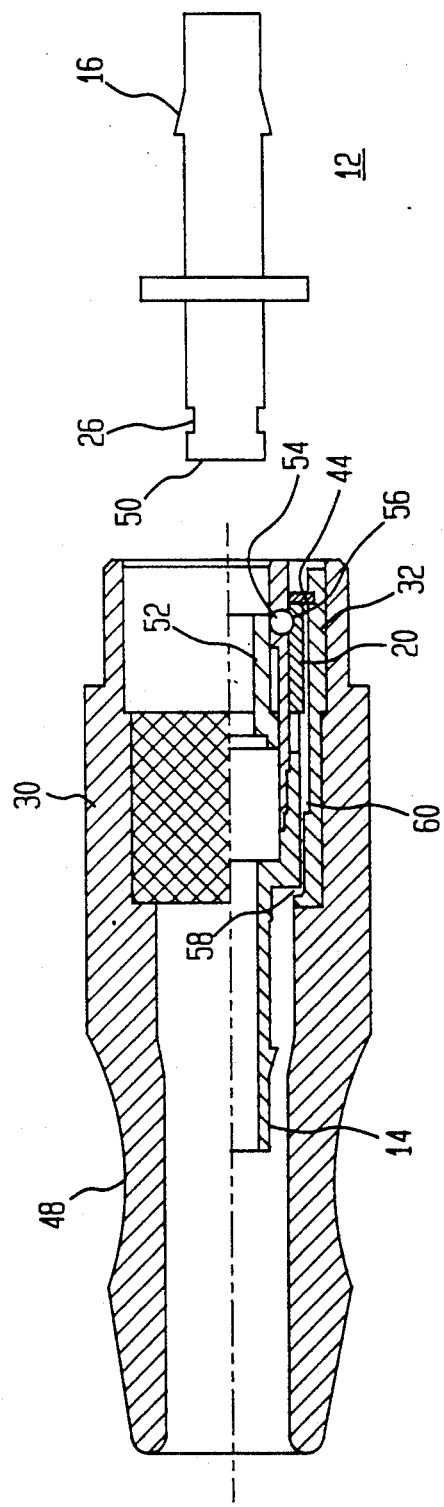
FIG. 3. illustrates in partial section view an enlargement of a portion of the assembled handle/coupling combination.

FIG. 3 illustrates in partial section view an enlarged version of the assembled coupler/handle. The user is merely required to grasp the indented portion 48 of handle 30 and push towards the male half 12 in order for the quick-action coupling to fully engage and lock. Conversely, the user merely pulls the handle in order to disengage the coupling.

When making the connection, as the male half 12 enters the female half 10, front face 50 of the male half engages a sliding sleeve 52 which is interior to female half 10 and which retains a plurality of locking ball bearings 54 within the female half. As male half 12 passes over ball bearings 54, slide 20 must be free to move in order to prevent the ball bearings from binding on sliding sleeve 52. When the male half is fully inserted, sleeve 52 is moved fully leftward, and bearings 54 are pushed into annular groove 26 of the male end by a spring-biased sliding action of slide 20 towards the right (bias spring not shown). In this position, slide 20 also serves to lock bearings 54 into groove 26 and prevent accidental release of male half 12.

As noted above, for disengaging the quick-action coupling the user grasps the handle, again conveniently at the same point 48, and merely pulls the connection apart. As the user pulls on handle 30, the annular ring 44 positioned in groove 42 of sleeve 32, engages a front facing edge of slide 20 and pulls it back so as to align its annular groove 56 with bearings 54. This releases bearings 54 so that they can be seated into groove 56 as the male half of the connection is withdrawn. Interior slide 52 is also spring biased, so as to follow the front face 50 of the male half 12 as it is withdrawn and thereby cover the other side of bearings 54 as they become exposed.

As shown in FIG. 3, a space 58 exists between the rear portion of body 18 and shoulder portion 36 of sleeve 32 and a somewhat bigger spacer exists between sleeve 32 and the rear edge of slide 20. Space 58 allows for some relative free-play between the female half 10 and sleeve 32. Space 60 is required to be somewhat longer than space 58 in order that sleeve 32, does not interfere with the free movement of slide 20 when the quick-action connection is being made.

Although not shown, a hose, as may be used for pressurized air, etc., is inserted through the rear opening of handle 30 so as to engage the hose barb portion 14 of body 18, and a similar hose connection is provided to portion 16 on the male half of the coupling.

Furthermore, although a specific slide/bearing releasable locking arrangement is shown in the preferred embodiment of the invention, it should be understood that the present invention does not require this specific type of releasably locking mechanism, and only requires that the locking mechanism include a slide member which slides over the outside of the body of the coupler and which must not be grasped by the user when making the connection, but which must be grasped by the user when breaking the connection.

Thus, there has been shown and described a novel handle for a quick-action coupling which shows and fulfills all the objects and advantages of a coupler sought therefor. Many changes, modifications, variations and other uses and applications of the subject invention will, however, become apparent to those skilled in the art after considering this specification and its accompanying drawings which disclose preferred embodiments thereof. All such changes, modifications, variations and other uses and applications which do not depart from the spirit and scope of the invention are deemed to be covered by the invention which is limited only by the claims which follow.

I claim:

1. In combination, a handle for the female half of a quick-action coupling, said coupling being of the type including a body having a first end adapted to receive a hose and a second end adapted to receive the male half of said coupling, a grasping means coupled to said body for releasably grasping the male half of said coupling when inserted into the second end of said body, and a spring-biased slide member coupled to said body and co-acting with said grasping means for causing a locking engagement between said male and female halves, wherein without said handle said user must grasp said slide member and move it towards said first end of said body in order to cause said grasping means to release said male half of said coupling, but said user must not push said slide member towards said second end when coupling said male and female halves together, wherein said handle comprises:

a housing having an interior opening in a first end thereof dimensioned so as to receive said female half of said coupling therein in a loose-fit sliding manner, said housing having a first annular means in its interior opening at a point which is remote from said first end thereof for engaging the body of said female half of said coupling so as to enable a user, via said housing, to push said female half of said coupling towards a corresponding male half of said coupling, without impeding movement of said slide member relative to said body, and the housing including in its interior opening at a point which is near said first end thereof a second annular means for engaging said slide member so as to slide said slide member within said interior opening relative to said body when the user pulls on said handle to separate said male and female halves of the coupling.

2. Apparatus according to claim 1, wherein said handle, comprises:

a shell having an axial bore therethrough: and
a sleeve;
one end of the bore in said shell being dimensioned so as to receive a hose and the other end of said bore being dimensioned so as to retain said sleeve therein in a manner which prevents movement between said sleeve and said shell.

3. Apparatus according to claim 2, wherein:
said sleeve includes said first and second annular means of said housing which engage said female half of said coupler.

4. Apparatus according to claim 3, wherein:
said sleeve includes said first annular means near one end thereof, and said second means portion is formed by a snap ring member retained in a groove near the other end of said sleeve.

5. Apparatus according to claim 4, wherein:
said female half of said coupling comprises a cylindrical body and said slide member comprises a cylindrical slide which slides over a portion of said body; and
the diameter of the inside surface of said sleeve is dimensioned so as to allow sliding relative movement between said sleeve and said female half of said coupler, said first annular means being formed in said sleeve at one end thereof so as to be slidably engageable with said body, and said annular groove being provided in the inside surface of said sleeve near its other end for receiving said snap ring, the distance between said first annular means and said snap ring being slightly greater than the distance between the portions of said body and said slide member which they respectively engage.

* * * * *